Figure 1:
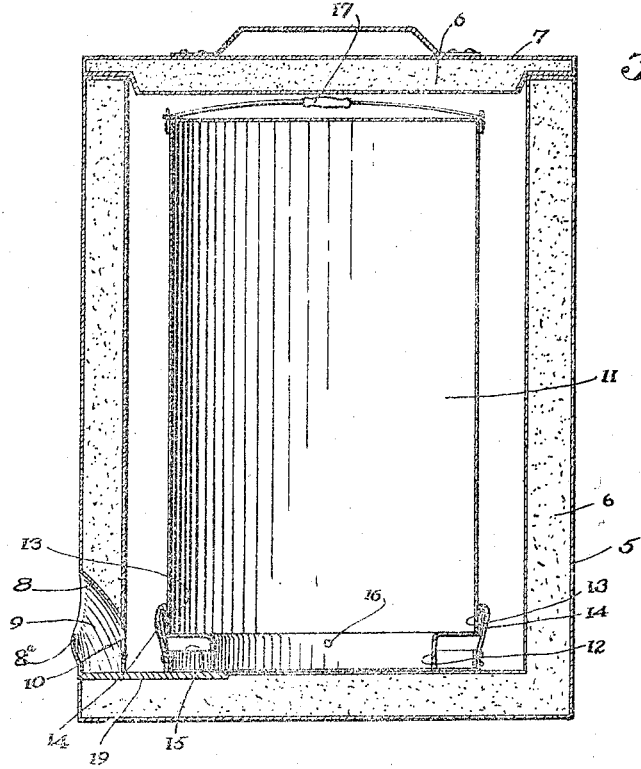

Jan. 13, 1925.

F. L. MORGAN

WATERING APPARATUS

Filed Nov. 2, 1923

1,522,828

Inventor
Francis L. Morgan
By Milo B. Stevens & Co.
Attorney

Patented Jan. 13, 1925.

1,522,828

UNITED STATES PATENT OFFICE.

FRANCIS L. MORGAN, OF WASHINGTON, IOWA.

WATERING APPARATUS.

Application filed November 2, 1923. Serial No. 672,362.

*To all whom it may concern:*

Be it known that I, FRANCIS L. MORGAN, a citizen of the United States, residing at Washington, in the county of Washington and State of Iowa, have invented new and useful Improvements in Watering Apparatus, of which the following is a specification.

My invention relates to drinking fountains for chickens and other fowls, and has for its primary object the provision of a drinking fountain of this kind which may be readily cleaned and disinfected.

Another important object of the invention resides in certain novel features of construction whereby the temperature of the water will be maintained constant in both warm and cold weather.

A still further object of the invention is the provision of a novel and improved means associated with a drinking cup and its supply reservoir for maintaining the water in the cup against freezing.

The above and other objects to be developed in the course of the detailed description appearing hereinafter, are attained by means of certain novel features of construction and arrangement of the various parts which will be better understood upon reference to the accompanying drawing forming a part of this specification.

In the drawing—

Figure 2:
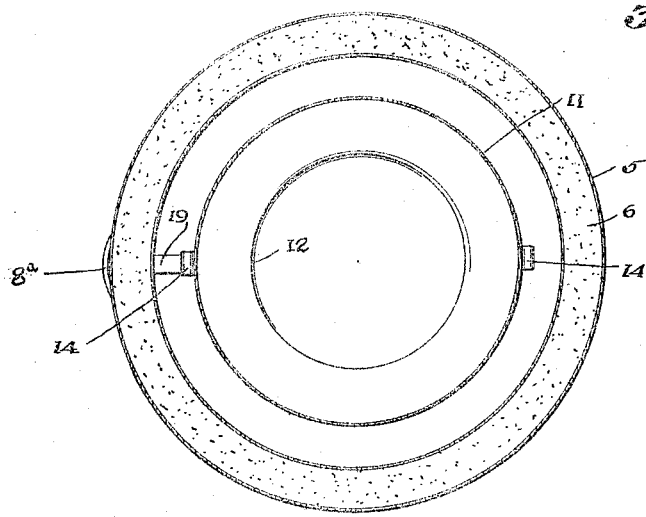

Figure 1 is a vertical sectional view through a drinking fountain constructed in accordance with my invention, and Fig. 2 is a cross section through the same.

Referring specifically to the drawing wherein the preferred embodiment of the invention is disposed, and in which like reference characters have been used to designate like parts in both views, numeral 5 denotes a double walled container, the space between the two walls being filled with a non-conducting material as shown at 6. A cover or lid 7 is provided for the container 5, and this cover is also formed with spaced walls between which insulating material 6 is disposed.

Adjacent the bottom portion of the container 5, the outer wall thereof is struck inwardly as shown at 8 to form a drinking pocket 9, communication being had through the inner wall through an opening 10 whereby water may flow into the drinking pocket from a removable reservoir 11 as will presently appear.

The reservoir 11 is preferably of cylindrical form, the same being provided with a reduced neck 12, while the diametrically opposite portions of the wall of the reservoir are provided with lateral ears or projections 13 for the engagement of spring hooks 14 whereby a pan 15 may be securely clamped against the bottom of the circumferential edge of the neck 12 to effectually close the same. It will be noted that the upper edge or rim of the pan 15 is spaced from the bottom portion of the reservoir between the side walls and neck thereof so that water passing through an aperture 16, in the neck, located in a plane above the rim of the pan, will pass thereover and flow through opening 10 to the drinking pocket 9.

From the foregoing description it will be apparent that the reservoir 11 may be readily removed for cleaning and refilling by merely taking off the receptacle cover 7 and lifting the reservoir out by means of the bail 17. This having been done the reservoir may be emptied by removing the pan 15. The container 5 may be thoroughly cleaned and the reservoir again filled through the neck 12 after which the pan 15 may be again hooked in place, the reservoir inverted and again placed in position for use. The aperture 16 in the neck 12 of the reservoir is as previously stated above the plane of the rim of the pan 15 but is below the lower edge $8^a$ of the drinking cup 9, the purpose of this arrangement being to prevent the water from flowing over the edge of the cup. The operation of the device will be automatic and the pressure of the air upon the surface of the water in the drinking cup or pocket 9 will hold back the head of water in the tank or reservoir 11 as long as the aperture or opening 16 in the neck 12 is covered by the water in the cup 9. As the water in the drinking cup is exhausted by the fowls, it will be replenished as long as there is any water in the reservoir 11. The outer wall of the drinking pocket is bulged outwardly to permit more ready access of fowls thereto.

The doubled wall construction of the container 5 and the cover 7 will maintain water in the reservoir 11 at a constant temperature. Now in order to likewise maintain the water in the drinking cup 9 at a constant temperature and especially to prevent freezing thereof during the winter time, I have provided a section 19 of copper or other substance of very high heat conductivity which extends to the inner portion of the bottom of the container 5 to derive heat from the water in the reservoir 11. This copper section 19 extends outwardly to the drinking cup 9, being extended through a slot in the inner receptacle wall and terminating at the outer wall portion of the receptacle which constitutes the outer wall of the cup 9. This copper section 19 may be brazed or otherwise secured in position, the container below the inwardly struck portion 8, being cut away if desired to permit the insertion of the section 19. It will thus be evident that the heat from the reservoir 11 being conducted to the drinking cup 8 through the copper section 19 will maintain the water within the drinking cup against freezing during cold weather. This is considered a highly advantageous expedient since it obviates the necessity of constantly breaking ice in the drinking cup in cold weather and also does away with any necessity for the use of an oil burner in proximity to the drinking cup to prevent freezing of the water therein.

While I have described and illustrated herein the preferred embodiment of my invention in accordance with the patent statutes, yet it will be distinctly understood that I do not propose to limit myself strictly thereto, since various changes and modifications thereof will immediately suggest themselves to those skilled in the art without departing from the spirit of my invention, the scope of which is defined in the following claims.

Having just described my invention, what I claim as new and desire to secure by Letters Patent is:

1. A poultry fountain comprising an outer receptacle having a detachable cover, a water container arranged in said receptacle in spaced relation to the side walls of the same and having its lower portion provided with a water discharge aperture, a tray receiving the lower portion of the container, said tray being provided with upwardly extending attaching members, and the lower portion of the container being provided with ears engaged by said attaching members whereby said tray is detachably connected to said water container, said receptacle being provided with a water containing pocket supplied with water through the aperture in the lower portion of said container, and a metallic element secured to the bottom of said receptacle, and underlying a portion of said tray, said metallic element forming the sole bottom wall of said water pocket and having a high rate of heat conductivity whereby a portion of the heat of the water in said container is transmitted to the water in said pocket to maintain the temperature of the water in the pocket close to the temperature of the water in the container.

2. A poultry fountain comprising an outer receptacle, a detachable cover, a water container arranged in said receptacle in spaced relation to the side walls of the same and having its lower portion reduced in diameter and formed with a water discharge aperture, a tray of approximately the same diameter as the major diameter of the container and partly receiving the reduced lower portion of the container, said tray being provided with oppositely arranged upwardly extending attaching members, and the lower portion of the container being provided with ears engaged by said attaching members whereby said tray is detachably connected to said water container, said receptacle being provided with a water containing pocket supplied with water discharged through the aperture in the lower portion of said container, and a metallic element secured to the bottom of said receptacle and underlying a portion of said tray, said metallic element forming the sole bottom wall of said water pocket and having a high rate of heat conductivity whereby a portion of the heat of the water in said container is transmitted to the water in said pocket to maintain the temperature of the water in the pocket close to the temperature of the water in the container.

In testimony whereof I affix my signature.

FRANCIS L. MORGAN.